United States Patent [19]
Blair, Jr.

[11] Patent Number: 5,669,946
[45] Date of Patent: Sep. 23, 1997

[54] AIR PARTICULATE FILTRATION DEVICE

[76] Inventor: Earl W. Blair, Jr., 430 Maple Croft St., Spartanburg, S.C. 29303

[21] Appl. No.: 592,688

[22] Filed: Jan. 26, 1996

[51] Int. Cl.$^6$ .................................................. B01D 47/02
[52] U.S. Cl. .......................... 55/234; 55/247; 55/255; 55/256; 95/211; 95/226; 261/123
[58] Field of Search .......................... 55/234, 255, 256, 55/247; 95/226, 211, 210; 261/120, 94, 121.1, 122.1, 123; 15/347, 353

[56] References Cited

U.S. PATENT DOCUMENTS

| | | | |
|---|---|---|---|
| 1,113,892 | 10/1914 | Feller | 261/120 X |
| 1,243,472 | 10/1917 | Wilson | 55/255 X |
| 1,286,951 | 12/1918 | Davies | 261/120 |
| 1,994,766 | 3/1935 | Heglar | 55/234 |
| 3,793,809 | 2/1974 | Tomany et al. | 95/226 X |
| 4,375,977 | 3/1983 | Honerkamp et al. | 55/234 |
| 4,851,016 | 7/1989 | Rylander | 261/120 X |
| 5,428,865 | 7/1995 | Yarbrough | 55/248 X |

FOREIGN PATENT DOCUMENTS 582815  12/1977  U.S.S.R. .................................. 55/255

*Primary Examiner*—Richard L. Chiesa
*Attorney, Agent, or Firm*—Dallis Law Firm, P.A.

[57] ABSTRACT

An air particulate filtration device designed to filter the primary filtration exhaust from a mechanical abrading dust collection device. The filtration device includes a flexible duct used to guide a positive pressure air stream from a mechanical abrading dust collection device into a receptacle partially filled with a liquid and buoyant packing material. The buoyant packing material aids in increasing the surface liquid contact with the positive pressure air stream. The fine dust and particulates that contact the liquid settle to the bottom of the receptacle. The positive pressure air stream passes though a final air filter located near the top of the filtration device after making contact with the liquid surface.

14 Claims, 3 Drawing Sheets

AIR PARTICULATE FILTRATION DEVICE

BACKGROUND OF THE INVENTION

1. Field of the Invention

The present invention relates to the field of air filtration devices and, more particularly, to an air particulate filtration device designed as a secondary and tertiary filtration device used to remove fine dust and particulates from the primary filtration exhaust of a mechanical abrading dust collecting device.

2. Description of the Related Art

The formation of fine dust and particulates resulting from an abrading action such as grinding, cutting, sanding, buffing or polishing hard surfaces is common in numerous manufacturing and processing fields. Abrading is often used as a finishing technique, necessary to complete the final touches on a surface or product. Whether conducted on a manufacturing floor of a large plant or inside a small shop, abrading can be the source of difficult to control fine dust and particulate formation. Existing air particulate and dust collection devices do not always effectively remove the smallest of dust particles. The consequences of ineffectively trapping fine dust and particulates may cause air breathing hazards and may be costly when dealing with precious metals.

In the fields of jewelry making and repair as well as dental lab work, the existing art includes dust collectors which are partially hooded, negative pressure air handling devices that pull air through a primary air filter during the abrading process. Despite the use of a primary filter or even a small baghouse air collection device, fine dust and particulates can pass though the filter and into the ambient, indoor air. These dust particles remain airborne until they settle onto a surface or wall. The purpose of the present invention is to maximize the collection of such dust particles that are small enough to escape through a primary filter. The collection of such particles both improve the ambient air quality and retrieval of precious metals dust.

The relevant prior art in the field of secondary dust or particulate collection devices includes U.S. Pat. No. 4,851,016 to Ronald Rylander which relates to a device for filtering a stream of air. The disclosure provided in this patent outlines a device specifically designed to collect asbestos fibers which are not captured by other primary filtration systems. The Rylander invention consists of a tank that holds water and an inlet and outlet exhaust. The air enters the top of the container and passes through a diffuser that hovers over the water. The exhaust air exits through a top circular filter.

U.S. Pat. No. 5,428,865 to Yarbrough relates to a water-filter vacuum sander used specifically for direct sanding operations. The Yarbrough device consists of a sanding head attached to a hose that exhausts into a container filled with water. Particulates collect in the water. The air exits an exhaust hose to an exhaust pump.

As presented by the existing and prior art, the use of water or a liquid to assist in the collection of dust and small particulates formed during abrading operations can be effective. In each of the prior art references provided, and those reviewed, however, the effectiveness of using water to strip the air of minute particulates is not as great as in the present invention.

The most effective means of using a liquid to remove dust and small air particulates from a positive pressure air stream is to maximize the surface area of the liquid being exposed to the positive pressure air stream. Creating simple turbulence along the top of a water surface does not maximize this effect. Conversely, a typical air scrubbing device which employs the use of a liquid tower containing inert packing material through which the liquid travels down the tower while the air (or gas) travels up the tower is perhaps the most efficient means of maximizing liquid surface area of a liquid. The present invention modifies this engineering technic and employs it on a smaller, simplified level.

SUMMARY OF THE INVENTION

It is therefore an objective of this invention to provide an effective means for removing fine dust and particulates from the primary filtration exhaust of mechanical abrading dust collection devices, such fine dust or particulates otherwise being released into the ambient air environment.

It is further an objective of this invention to provide a facile attachment means for capturing the primary filtration exhaust of mechanical abrading dust collection devices.

It is still further an objective of this invention to provide a cost savings means of removing fine dust and particulates of precious metals not captured by the primary filtration exhaust of mechanical abrading dust collection devices so that such fine dust may be collected and sold to a smelter for reclaiming the precious metals.

These as well as other objectives are accomplished with an air particulate filtration device designed to filter the primary filtration exhaust from a mechanical abrading dust collection device. The filtration device comprises a flexible duct used to guide the positive pressure air stream from the mechanical abrading dust collection device into a receptacle partially filled with a liquid and buoyant packing material. The buoyant packing material aids in increasing the surface liquid contact with the positive pressure air stream. The fine dust and particulates that contact the liquid settle to the bottom of the receptacle. The positive pressure air stream passes though a final air filter located near the top of the filtration device after making contact with the liquid surface. If the fine dust and particulates are from a precious metal such as gold or silver, the contents of the filtration device may be removed so that such dust and particulates may be reclaimed. This is accomplished by collecting the contaminated liquid and wiping the inside of the receptacle. Both the liquid contents, wiping materials and air filter may be sold to a smelter for reclaiming the precious metals.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
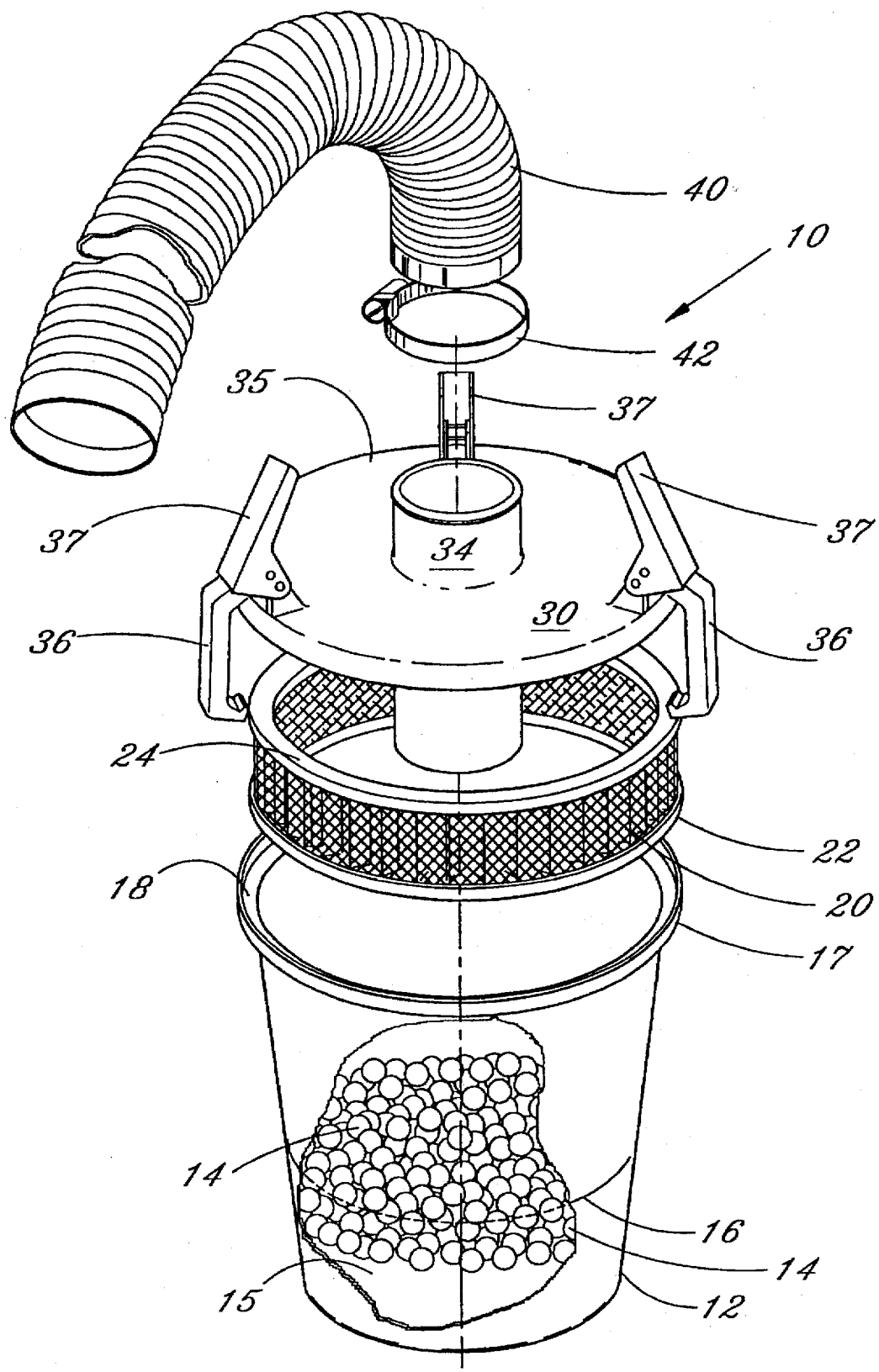
FIG. 1 of the drawings shows a perspective, sectionalized view of the present invention revealing the inter relationship between all the major elements.

Referring to the drawings by numerals of reference, there is shown in FIG. 1 the air particulate filtration device (10). This filtration device (10) comprises a receptacle (12), upon which is secured an air filter (20) by means of a lid (30) through which passes a vessel duct (34) connected to a flexible duct (40).

Referring to FIG. 1, the flexible duct (40) is shown leading from the primary filtration exhaust of a mechanical abrading dust collection device. The flexible duct (40) is secured to the vessel duct (34) by means of a screw clamp (42) or similar device. The air filter (20) is sandwiched between the lid (30) and the receptacle (12) by means of hinge clamps (36). The top seal ring (24) of the air filter (20) seals unfiltered air gaps between the lid (30) and the top of the air filter (20). The bottom seal ring (22) of the filter (20) rests inside the inner receptacle lip (18) of the receptacle (12) sealing unfiltered air gaps between the receptacle (12) and air filter (20). The lid (30) is closed over the air filter (20) and the receptacle (12) by engaging the hinge arms (37) thereby clamping the hinge clamps over the outer receptacle lip (17). The contents of the receptacle (12) includes a quantity of liquid (15) with a buoyant packing material layer (14) located both above and slightly below the liquid surface (16).

Figure 2:
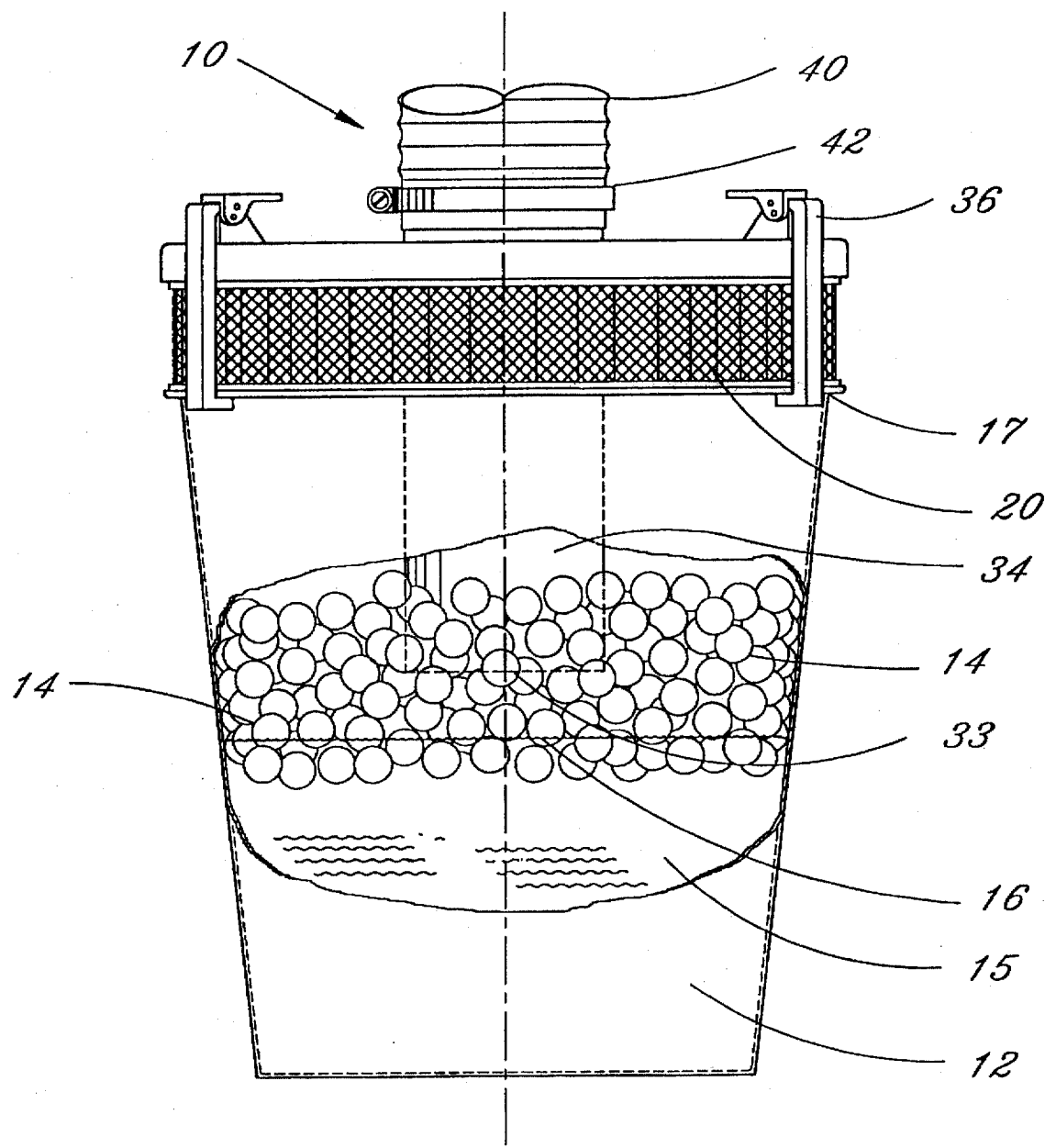
FIG. 2 of the drawings shows a side, elevational view of the present invention with a cut-away section showing the device at rest.

Referring to FIG. 2, the filtration device (10) is shown in an assembled, resting position with a cut-away view revealing the interior contents. Prior to activation, the receptacle (12) is filled with an appropriate liquid (15), such as water. The liquid level (16) used in the receptacle (12) is predetermined by a liquid level mark etched into the side wall of the receptacle (12). The liquid level (16) is sufficient to cause the vessel duct outlet (33) to be partially submerged into the buoyant packing material layer (14) but, in any case, not below the liquid level (16) itself.

Figure 3:
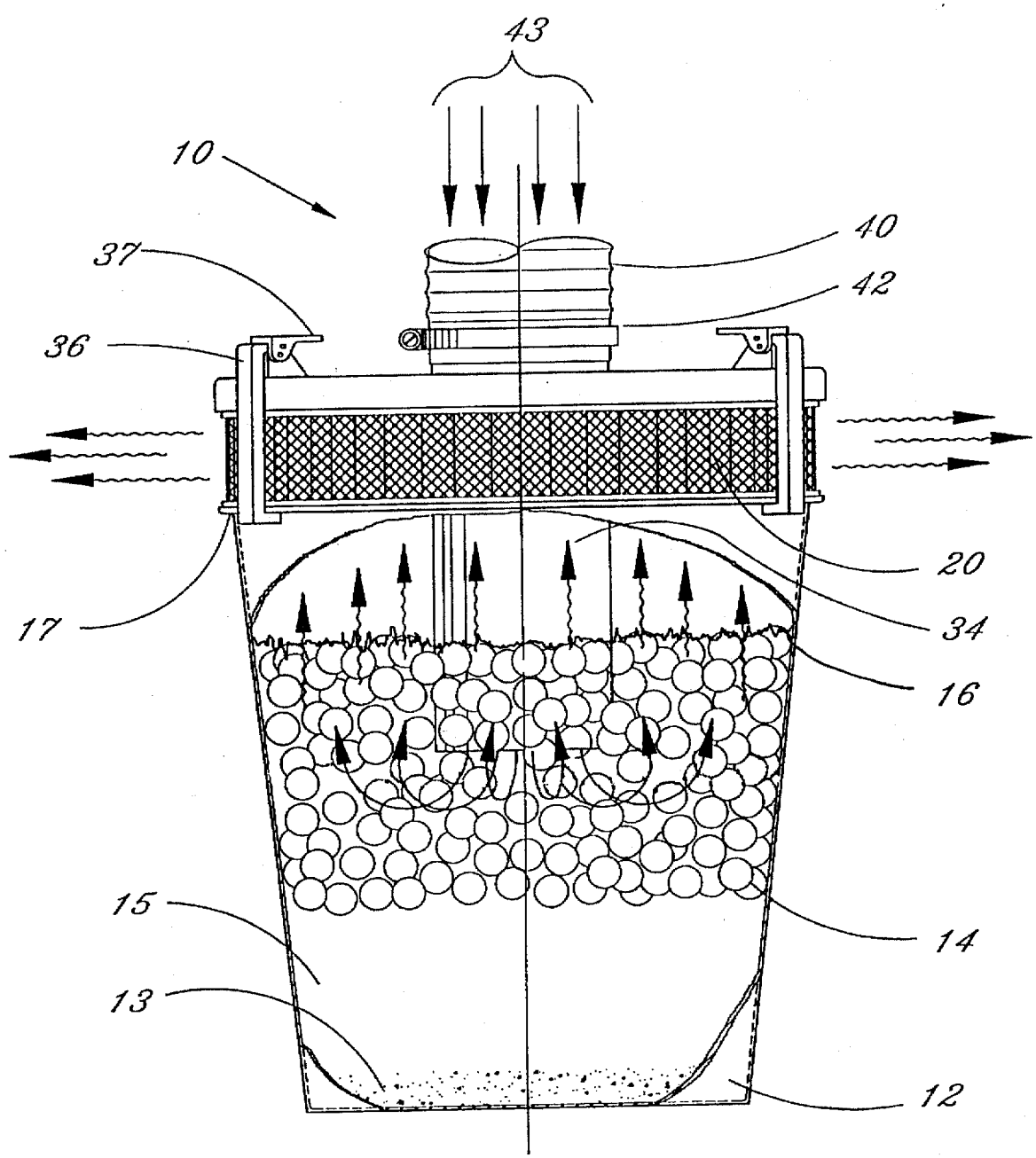
FIG. 3 of the drawings shows the same side, elevational view of the present invention as is shown in FIG. 2 with a more revealing cut-away section showing the invention during operation.

Referring to FIG. 3, the filtration device (10) is shown in the activated mode. The filtration device is activated when the flexible duct (40) is connected to a source of primary filtration exhaust such as that created by a polishing dust collection device used in the jewelry making and repair business. The existing fan motor of a polishing dust collection device is the source of the positive pressure air stream (43) that passes through the filtration device (10). The filtration device (10) is designed to capture the fine dust and particulates that are not filtered by the existing primary filter of a mechanical abrading dust collection device such as that contained within a polishing dust collection device. Although the preferred embodiment was designed for receiving a positive pressure air stream from a source of primary filtration exhaust, it is not intended that use of the present invention be restricted to such positive pressure air streams.

Still referring to FIG. 3, the design of the filtration device (10) is such that the buoyant packing material layer (14) is intended to occupy only a portion of the volume of the receptacle necessary to control the turbulence created when the device is activated. The buoyant packing material layer (14) allows greater contact between the positive pressure air stream (43) and the liquid (15) by increasing the surface area contact of the liquid (15). An added advantage of using the buoyant packing material layer (14) is that the positive pressure air stream (43) rate may be greater than would be advisable in the absence of the buoyant packing material layer (14) since the liquid turbulence is better controlled and does not saturate the air filter (20). The positive pressure air stream passes through a final filtration barrier and into the ambient air through the air filter (20).

After continued use of the air particulate filtration device (10), fine dust and particulates (13) settle to the bottom of the receptacle (12). The buoyant packing material layer (14) is made of inert, plastic material upon which such fine dust and particulates (13) would not adhere. In the jewelry making and repair business as well as dental lab work, this fine dust and particulates may comprise expensive precious metal particles such as gold and silver. These particles can be easily reclaimed by collecting the liquid (15) contents of the receptacle (12), wiping the inside walls of the receptacle (12) and selling the precious metals to a smelter.

A preferred embodiment of the present invention is described herein. It is to be understood, of course, that changes and modifications may be made in the embodiment without departing from the true scope and spirit of the present invention as defined by the appending claims.

That which is claimed is:

1. An air scrubbing device for removing particulates, comprising, in combination:

a. a receptacle having an open end for holding a quantity of liquid, said quantity of liquid having a liquid surface;

b. a removable air filter secured to said receptacle above said liquid surface;

c. a removable lid for covering said open end of said receptacle;

d. a layer of unsupported, buoyant packing material comprising a plurality of mobile, unattached, individual bodies floating on top of said liquid surface inside said receptacle; and e. means for conveying a positive pressure air stream downward into said layer of buoyant packing material and through said air filter into the ambient air environment such that, in the process, said positive pressure air stream becomes thoroughly mixed with said quantity of liquid inside said receptacle causing said mobile, unattached, individual bodies to circulate from said liquid surface throughout said quantity of liquid whereby fine dust and particulates in said positive pressure air stream are captured by said quantity of liquid.

2. The air scrubbing device for removing particulates as claimed in claim 1 wherein said means for conveying a positive pressure air stream downward into said layer of buoyant packing material and through said air filter comprises:

a. a positive pressure air stream;

b. a flexible duct having a first and second end, said first end connected to said positive pressure air stream;

c. a vessel duct having an inlet air end and a receptacle end, said vessel duct secured to, and passing through, said lid, said receptacle end of said vessel duct extending into said layer of buoyant packing material inside said receptacle above said liquid surface, said second end of said flexible duct being removably attached to said inlet air end of said vessel duct; and d. a vessel side and an ambient side of said air filter, wherein said positive pressure air stream, after thoroughly mixing with said quantity of liquid, passes into said vessel side of said air filter through said ambient side of said air filter into the ambient air environment.

3. The air scrubbing device for removing particulates as claimed in claim 2 wherein said positive pressure air stream comes from a primary filtration exhaust of a mechanical abrading dust collecting device.

4. The air scrubbing device for removing particulates as claimed in claim 1 wherein said plurality of mobile, unattached, individual bodies is made of high density plastic.

5. The air scrubbing device for removing particulates as claimed in claim 4 wherein said plurality of mobile, unattached, individual bodies is spherical in shape.

6. An air scrubbing device for removing particulates, comprising, in combination:

a. a receptacle having an open end for holding a quantity of liquid, said quantity of liquid having a liquid surface;

b. a removable air filter secured to said receptacle above said liquid surface;

c. a removable lid for covering said open end of said receptacle and clamped to said receptacle;

d. a layer of buoyant packing material over said liquid surface inside said receptacle, said layer of buoyant packing material comprising a plurality of mobile, unattached, individual bodies made of high density plastic and spherical in shape;

e. means for conveying a positive pressure air stream downward into said layer of buoyant packing material and through said air filter into the ambient air environment such that, in the process, said positive pressure air stream becomes thoroughly mixed with said quantity of liquid inside said receptacle causing said mobile, unattached, individual bodies to circulate from said liquid surface throughout said quantity of liquid whereby fine dust and particulates in said positive pressure air stream are captured by said quantity of liquid.

7. The air scrubbing device for removing particulates as claimed in claim 6 wherein said means for conveying a positive pressure air stream downward into said layer of buoyant packing material and through said air filter comprises:

a. a positive pressure air stream coming from a primary filtration exhaust of a mechanical abrading dust collecting device;

b. a flexible duct having a first and second end, said first end connected to said positive pressure air stream;

c. a vessel duct having an inlet air end and a receptacle end, said vessel duct secured to, and passing through, said lid, said receptacle end of said vessel duct extending into said layer of buoyant packing material inside said receptacle above said liquid surface, said second end of said flexible duct being removably attached to said inlet air end of said vessel duct; and d. a vessel side and an ambient side of said air filter, wherein said positive pressure air stream, after thoroughly mixing with said quantity of liquid, passes into said vessel side of said air filter through said ambient side of said air filter into the ambient air environment.

8. A device for removing and capturing air particulates from a positive pressure air stream, comprising, in combination:

a. an enclosed containment vessel having an air intake and air outlet through which said positive pressure air stream is conveyed such that said enclosed containment vessel comprises:

i. a receptacle having an open end for holding a quantity of liquid, said quantity of liquid having a liquid surface;

ii. a removable air filter secured to said receptacle above said liquid surface, said air filter serving as said air outlet of said enclosed containment vessel;

iii. a removable lid for covering said open end of said receptacle;

b. a duct for conveying said positive pressure air stream into said enclosed containment vessel; and c. a layer of unsupported, buoyant packing material comprising a plurality of mobile, unattached, individual bodies floating on top of said liquid surface inside said receptacle creating a thorough mixing between said positive pressure air stream and said liquid surface causing said mobile, unattached, individual bodies to circulate from said liquid surface throughout said quantity of liquid whereby fine dust and particulates in said positive pressure air stream are captured by said quantity of liquid.

9. The device for removing and capturing air particulates from a positive pressure air stream as claimed in claim 8 wherein said duct comprises:

a. a flexible duct having a first and second end, said first end connected to said positive pressure air stream; and b. a vessel duct having an inlet air end and a receptacle end, said vessel duct secured to, and passing through, said lid, said receptacle end of said vessel duct extending into said layer of unsupported, buoyant packing material inside said receptacle above said liquid surface, said second end of said flexible duct being removably attached to said inlet air end of said vessel duct.

10. The device for removing and capturing air particulates from a positive pressure air stream as claimed in claim 8 wherein said positive pressure air stream is created by a primary filtration exhaust of a mechanical abrading dust collecting device.

11. The device for removing and capturing air particulates from a positive pressure air stream as claimed in claim 9 wherein said plurality of mobile, unattached, individual bodies is made of high density plastic.

12. The device for removing and capturing air particulates from a positive pressure air stream as claimed in claim 9 wherein said plurality of mobile, unattached, individual bodies is spherical in shape.

13. A device for removing and capturing air particulates from a positive pressure air stream, comprising, in combination:

a. an enclosed containment vessel having an air intake and air outlet through which said positive pressure air stream is conveyed such that said enclosed containment vessel comprises:

i. a receptacle having an open end for holding a quantity of liquid, said quantity of liquid having a liquid surface;

ii. a removable air filter secured to said receptacle above said liquid surface, said air filter serving as said air outlet of said enclosed containment vessel; and iii. a removable lid for covering said open end of said receptacle, said lid being clamped to said receptacle;

b. a duct for conveying said positive pressure air stream into said enclosed containment vessel, said duct comprising:

i. a flexible duct having a first and second end, said first end connected to said positive pressure air stream; and ii. a vessel duct having an inlet air end and a receptacle end, said vessel duct secured to, and passing through, said lid, said receptacle end of said vessel duct extending into said layer of buoyant packing material inside said receptacle above said liquid surface, said second end of said flexible duct being removably attached to said inlet air end of said vessel duct; and c. a layer of unsupported, buoyant packing material comprising a plurality of mobile, unattached, individual bodies made of high density plastic and spherical in shape floating on top of said liquid surface inside said receptacle creating a thorough mixing between said positive pressure air stream and said liquid surface causing said mobile, unattached, individual bodies to circulate from said liquid surface throughout said quantity of liquid whereby fine dust and particulates in said positive pressure air stream are captured by said quantity of liquid.

14. The device for removing and capturing air particulates from a positive pressure air stream as claimed in claim 13 wherein said positive pressure air stream is created by a primary filtration exhaust of a mechanical abrading dust collecting device.

* * * * *